No. 644,847. Patented Mar. 6, 1900.
M. COOPER.
PROCESS OF PREVENTING FORMATION OF FROST ON REFRIGERATING SURFACES.
(Application filed Sept. 25, 1899.)
(No Model.)
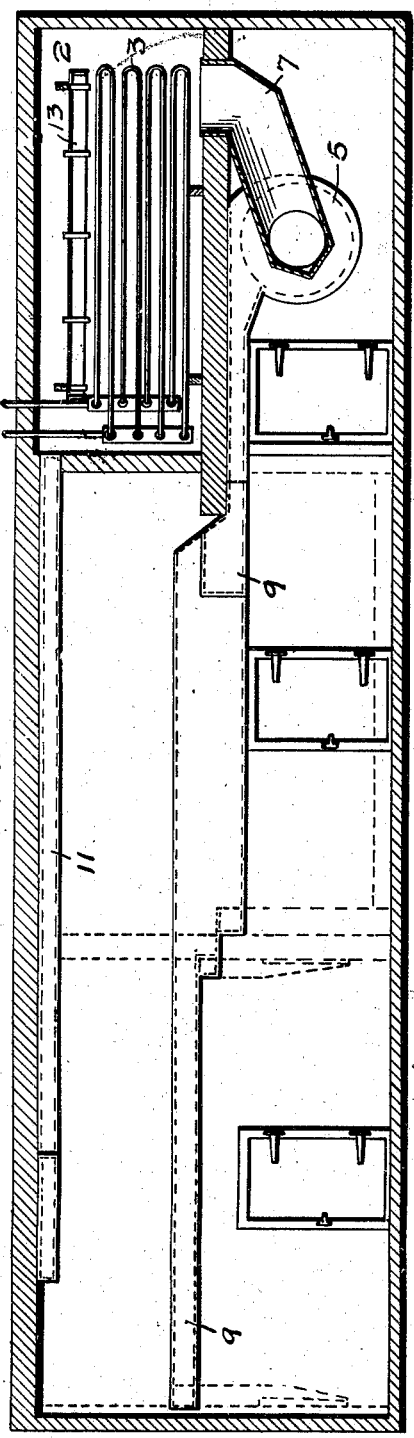
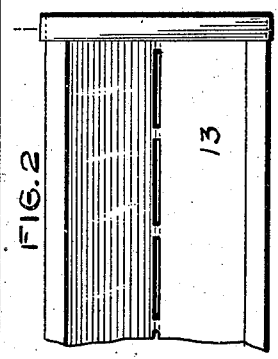
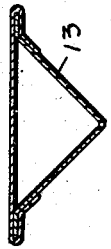
WITNESSES
INVENTOR
MADISON COOPER
BY
Paul H Hawley
HIS ATTORNEYS

UNITED STATES PATENT OFFICE.

MADISON COOPER, OF MINNEAPOLIS, MINNESOTA.

PROCESS OF PREVENTING FORMATION OF FROST ON REFRIGERATING-SURFACES.

SPECIFICATION forming part of Letters Patent No. 644,847, dated March 6, 1900.

Application filed September 25, 1899. Serial No. 731,557. (No specimens.)

*To all whom it may concern:*

Be it known that I, MADISON COOPER, of Minneapolis, Hennepin county, Minnesota, have invented certain new and useful Improvements in Processes of Preventing the Formation of Frost Upon Refrigerating-Surfaces, of which the following is a specification.

This invention relates to a new and useful process of preventing the formation of frost upon refrigerating-surfaces and at the same time dehydrating and purifying the air which is brought in contact with such refrigerating-surfaces.

The invention consists generally in the process of preventing the formation of frost upon refrigerating-surfaces by placing chlorid of calcium or other deliquescent salt in proximity to such refrigerating-surfaces, whereby the moisture from the atmosphere will be absorbed by said salt and a brine will be formed, which will flow over said refrigerating-surfaces, thereby preventing the formation of frost thereon.

The invention consists, further, in the process of dehydrating and purifying the air by passing it over pipes or other surfaces which are moistened by the brine resulting from the union of a deliquescent salt with the moisture of the air.

In the accompanying drawings, which illustrate means for carrying out my improved process, Figure 1 is a longitudinal vertical section of a cold-storage apparatus in connection with which my process may be employed. Fig. 2 is a plan view, and Fig. 3 a transverse section, of a trough or gutter that may be used in carrying out my process. Fig. 4 is a perspective view showing a series of troughs or gutters arranged in connection with refrigerating-pipes for carrying out my process.

In carrying out my improved process I employ chlorid of calcium or other deliquescent salt which is placed in proximity to pipes or other refrigerating-surfaces. The moisture from the air uniting with the salt forms a brine which flows over the refrigerating-surfaces and prevents the formation of frost thereon. This action also dehydrates and purifies the air.

As illustrating suitable apparatus for carrying out my process, I have shown in Fig. 1 of the drawings a cold-storage apparatus provided with an air-cooling room 2. Arranged in this room are suitable refrigerating pipes or surfaces 3. The air is drawn from this room by means of a fan or blower 5 through a suitable conductor 7. From the fan-casing the air passes through suitable conductors 9 to the storage-rooms from which it is distributed by suitable means throughout the lower portions of the rooms. The air passes through the storage-rooms and through perforated false ceilings or other suitable devices to the return ducts or conveyers 11, through which it is carried back to the air-cooling room 2. Arranged in the air-cooling room, preferably directly over the refrigerating pipes or surfaces 3, are a series of troughs or gutters 13, provided, preferably, with slotted or perforated bottoms. These troughs or gutters have chlorid of calcium or other deliquescent salt placed therein, as indicated in Fig. 4 of the drawings. The moisture of the air unites with this salt, forming a brine which escapes through the perforated bottom of the trough or gutter and flows over the refrigerating pipes or surfaces, and thereby prevents the formation of frost upon said pipes or surfaces. This action also dehydrates and purifies the air, rendering it suitable to be again forced through the cold-storage rooms. The brine after flowing over the refrigerating-surfaces and collecting the impurities from the air may be led into a suitable conductor and discharged into the waste-pipe or sewer.

I do not limit myself to the details of the process nor to its use in connection with any particular apparatus. The apparatus herein illustrated is considered to be suitable for the purpose; but obviously any other suitable devices may be used in place of those herein shown and described.

I do not in this application claim the apparatus herein shown, as I have claimed the same in a separate application, Serial No. 722,633, filed July 3, 1899.

Having thus described my invention, I claim as new and desire to secure by Letters Patent—

1. The process of preventing the formation of frost upon refrigerating-surfaces, which consists in placing chlorid of calcium, or other deliquescent salt in a solid form, in proximity to said surfaces permitting the moisture of the atmosphere to unite with said deliquescent salt to form a brine and allowing said brine to flow over said refrigerating-surfaces.

2. The process of keeping refrigerating-surfaces free from frost and purifying and drying the air which is to be cooled by said surfaces, which consists of placing chlorid of calcium, or other deliquescent salt in a solid form in proximity to said surfaces and passing air over said surfaces while they are coated with brine formed by the uniting of the moisture of the atmosphere with said salt.

3. The process of dehydrating and purifying air, which consists in placing chlorid of calcium or other deliquescent salt in a solid form in proximity to pipes or other surfaces, passing air over said pipes or other surfaces and over said salt and permitting the brine formed by the union of the moisture of the air with said salt to flow over said pipes or surfaces.

In testimony whereof I have hereunto set my hand this 21st day of September, 1899.

MADISON COOPER.

In presence of—
  A. C. PAUL,
  A. F. HOLMES.